United States Patent
Caley et al.

(10) Patent No.: US 9,284,928 B2
(45) Date of Patent: Mar. 15, 2016

(54) FUEL INJECTOR ICING

(75) Inventors: David James Caley, City Beach (AU); Geoffrey Paul Cathcart, Mount Lawley (AU)

(73) Assignee: Orbital Australia Pty Ltd, Balcatta, Western Australia (AU)

( * ) Notice: Subject to any disclaimer, the term of this patent is extended or adjusted under 35 U.S.C. 154(b) by 195 days.

(21) Appl. No.: 13/807,484

(22) PCT Filed: Jun. 30, 2011

(86) PCT No.: PCT/AU2011/000810
§ 371 (c)(1),
(2), (4) Date: Feb. 18, 2013

(87) PCT Pub. No.: WO2012/000039
PCT Pub. Date: Jan. 5, 2012

(65) Prior Publication Data
US 2013/0233274 A1    Sep. 12, 2013

(30) Foreign Application Priority Data
Jun. 30, 2010   (AU) ................. 2010902905

(51) Int. Cl.
*F02M 21/02* (2006.01)
*F02M 39/00* (2006.01)
*F02M 53/04* (2006.01)

(52) U.S. Cl.
CPC ............... *F02M 39/00* (2013.01); *F02M 21/02* (2013.01); *F02M 21/0218* (2013.01); *F02M 21/0278* (2013.01); *F02M 21/0281* (2013.01); *F02M 21/0287* (2013.01); *F02M 53/046* (2013.01); *F02M 21/0212* (2013.01); *F02M 21/0215* (2013.01); *Y02T 10/32* (2013.01)

(58) Field of Classification Search
CPC   F02M 21/02; F02M 21/0218; F02M 21/0278
USPC ..................... 123/490, 27 GE, 525, 526, 527, 123/575–578, 499
See application file for complete search history.

(56) References Cited

U.S. PATENT DOCUMENTS 4,421,280 A  * 12/1983  Lewis et al. ................. 239/132.5
5,076,244 A    12/1991  Donaldson
5,280,774 A  *  1/1994  Entenmann et al. .......... 123/457

(Continued)

FOREIGN PATENT DOCUMENTS

KR        2004-0083228 A     10/2004
KR          100630418 B1  *   9/2006  ............. F02M 21/02

OTHER PUBLICATIONS

KR 100630418 (Chang-Eop Kim) Sep. 29, 2006 (English Translation). [online] [retrieved on Feb. 25, 2015]. Retrieved from K-PION Database.*

(Continued)

*Primary Examiner* — Mahmoud Gimie
(74) *Attorney, Agent, or Firm* — Harness, Dickey & Pierce, P.L.C.

(57) ABSTRACT

A fuel injector (10) for liquid phase injection of liquefied gaseous fuels for combustion chambers of an internal combustion engine. The fuel injector (10) comprises a nozzle portion (15) having an end (30) from which gaseous fuel can be delivered through an outlet (21), the end (30) being configured to prevent or at least inhibit formation of ice thereon upon delivery of gaseous fuel through the outlet.

25 Claims, 4 Drawing Sheets

(56) References Cited

U.S. PATENT DOCUMENTS

| | | | | |
|---|---|---|---|---|
| 5,666,926 | A | * | 9/1997 | Ferrera et al. ............. 123/525 |
| 6,382,182 | B1 | * | 5/2002 | Green et al. ............ 123/406.75 |
| 7,182,073 | B1 | | 2/2007 | Kim |
| 7,581,686 | B2 | * | 9/2009 | Holzgrefe et al. ............ 239/456 |
| 7,949,460 | B2 | | 5/2011 | Song et al. |
| 2004/0231618 | A1 | * | 11/2004 | Shinkarenko et al. .... 123/27 GE |
| 2007/0044774 | A1 | * | 3/2007 | Kim ............................. 123/527 |

OTHER PUBLICATIONS

International Search Report and Written Opinion of the ISA, ISA/AU, mailed Oct. 18, 2011.

International Preliminary Report on Patentability (7 pages) with Letter in Response to Written Opinion (5 pages) and Annexes (36 pages), ISA/AU, mailed Oct. 22, 2012.

* cited by examiner

FUEL INJECTOR ICING

CROSS-REFERENCE TO RELATED APPLICATIONS

This application is a 371 U.S. National Stage of International Application No. PCT/AU2011/000810, filed Jun. 30, 2011, which claims priority to Australian Patent Application No. 2010902905, filed Jun. 30, 2010. The disclosures of the above applications are incorporated herein by reference.

FIELD OF THE INVENTION

The present invention relates to injection of fuels in internal combustion engines. The invention is particularly applicable to liquid phase injection (LPI) of liquefied gaseous fuels such as such as liquefied petroleum gas (LPG) and liquefied natural gas (LNG).

BACKGROUND ART

The following discussion of the background art is intended to facilitate an understanding of the present invention only. The discussion is not an acknowledgement or admission that any of the material referred to is or was part of the common general knowledge as at the priority date of the application.

For the LPI process it is necessary to deliver liquefied gaseous fuel to a fuel injector in the liquid phase. The requirement to maintain the liquid phase of the liquefied gaseous fuel necessitates that the fuel be maintained under pressure.

During the delivery process there is a phase change at the outlet of the injector, which can lead to rapid cooling and, consequently, formation of ice on the tip of the injector nozzle. The formation of ice on the injector nozzle is disadvantageous as it can lead to deterioration in the performance of the nozzle.

There have been various strategies proposed to address the issue of icing of an injector nozzle.

For indirect injection applications, one known strategy involves configuring the fuel injector as an injector body and a nozzle portion, with the nozzle portion providing an extension from the nozzle body to terminate at the nozzle tip. The extension is adapted to be received in an injection socket which is typically an intake manifold injector bore. The extension defines a delivery path which extends from a receiving chamber within the injector body and along which the gaseous fuel can be conveyed to the nozzle tip for delivery into the injection socket.

The extension comprises an inner tube defining the fuel delivery path terminating at the nozzle tip and a casing surrounding the inner tube, the casing presenting an end face at the tip of the nozzle portion.

Typically, the inner tube terminates at the end face of the nozzle portion so as to be flush therewith. However, some variation can occur due to imprecision in the assembly process in relation to positioning of the end of the inner tube with respect to the end of the nozzle portion, with the result that the inner tube can often protrude beyond, or terminate inwardly of, the end face of the nozzle. Unexpected or unwanted protrusion of the inner tube beyond the end face can be undesirable in certain circumstances. It is undesirable if the protrusion is to such an extent that the exposed section of the inner tube is chilled during the delivery process so that a detrimental build-up of ice develops on the exposed surface of the tube. Further, it is undesirable if the protrusion is to such an extent as to affect alignment of the protruding portion of the inner tube and thereby affect the direction of delivery of the gaseous fuel. Similarly, termination of the inner tube inwardly of the end face may expose the surrounding region of the nozzle portion to fluid flow in the fuel delivery process. This may obstruct the delivery of gaseous fuel and also chill the surrounding region of the nozzle portion, causing detrimental ice formation.

The casing about the inner tube is adapted to provide thermal insulation to prevent heat transfer during passage of the liquefied gaseous fuel to the outlet. Further, the extension is adapted to collect heat from the engine, thereby contributing to a reduction in thermal losses during passage of the liquefied gaseous fuel to the outlet. Additionally, heat so collected may assist in the reduction of icing at the nozzle outlet.

Notwithstanding these strategies, icing at the nozzle outlet can still occur.

It would be advantageous to provide an arrangement which overcomes, or at least ameliorates, the potential for icing at the nozzle tip while also avoiding the need for precision in the location of the end of the inner tube with respect to the end of the nozzle portion in order for effective delivery of the injected gaseous fuel.

DISCLOSURE OF THE INVENTION

According to a first aspect of the invention there is provided a fuel injector for liquid phase injection of liquefied gaseous fuels into an internal combustion engine, the fuel injector comprising a nozzle portion having an end from which gaseous fuel can be delivered through an outlet, the end being configured to prevent or at least inhibit formation of ice thereon upon delivery of gaseous fuel through the outlet.

The formation of ice can be detrimental to fuel metering accuracy and the quality of the issuing fuel plume.

In one arrangement, the end of the nozzle portion may be so configured by the disposition of the outlet relative to a surface at the end of the nozzle portion surrounding the outlet.

Preferably, the outlet is disposed beyond the surrounding surface such that the surrounding surface is located away from the path of fuel issuing from the outlet.

While the outlet may be disposed beyond the surrounding surface by any appropriate amount to achieve the desired outcome of preventing or at least inhibiting of formation of ice, it is believed that a spacing of about 0.05 to 0.5 mm between the outlet and the surrounding surface will be particularly effective.

The surrounding surface may comprises a planar surface existing at the end of the nozzle portion or the surrounding surface may be defined by a formation at the end of the nozzle portion.

The formation may comprise a recess in the end of the nozzle portion about the outlet.

The recess may comprise a depression formed in the end of the nozzle portion, with the inner portion of the depression defining the surrounding surface about the outlet.

Preferably, the nozzle portion comprises an inner tube defining a fuel flow path terminating at the outlet, and a casing surrounding the inner tube, the casing presenting an end about the outlet, wherein at least a portion of the end defines the surrounding surface.

With this arrangement, the inner tube has an end section protruding beyond the surrounding surface, with the end section terminating at the outlet.

Preferably, the casing has an end face, and the end of the inner tube may be flush with the end face, terminate inwardly of the end face or protrude beyond the end face, with the outlet being so disposed with respect to the end face to prevent or at least inhibit formation of ice thereon upon delivery of gaseous fuel through the outlet.

Where the inner tube terminates inwardly of the end face, the extent to which the outlet is set back from the end face is controlled and selected to prevent or at least inhibit formation of ice thereon upon delivery of gaseous fuel through the outlet.

Where the inner tube protrudes with respect to the end face, the extent of the protrusion is controlled and selected to prevent or at least inhibit formation of ice thereon upon delivery of gaseous fuel through the outlet. Further, the extent of the protrusion is controlled It is particularly desirable for the inner tube to terminate close to, but not flush with, the end face.

Preferably, the end section of the inner tube is preferably within the confines of the casing to thereby be afforded protection by the casing.

The depression may be of any suitable configuration in profile. In one arrangement, the depression may be configured as a countersunk hole in the end face of the casing. The countersunk hole may comprise a straight cylindrical hole having an inner face transverse to the longitudinal extent of the inner tube and a cylindrical side wall coincident with the inner tube. In another arrangement, the depression may be configured as a hole having a tapering side extending outwardly towards the end face. In yet another arrangement, the depression may be configured to provide a semi-spherical profile in the end face.

Preferably, the inner tube protrudes beyond the adjacent portion of the surrounding surface by about 0.05 to 1.5 mm, and more preferably protrudes beyond the adjacent portion of the surrounding surface by 0.05 to 0.5 mm.

Where the end portion of the inner tube defining the outlet is surrounded by a recess in the end face, the extent to which the inner tube protrudes beyond the surrounding surface defined by the recess could be within the range mentioned above.

Where the end portion of the inner tube defining the outlet extends beyond the end face, the extent of the protrusion may more preferably be within the range 0.05 to 0.5 mm.

In another arrangement, the formation may comprise a protrusion on the end of the nozzle portion.

With such an arrangement, the protrusion would preferably surround the end of the inner tube.

In another arrangement, the end of the nozzle portion may be provided with means for shielding the end from the path of fuel issuing from the outlet.

The means for shielding the end from the path of fuel issuing from the outlet may comprise an attachment on the end of the nozzle portion.

According to a second aspect of the invention there is provided a fuel injector for liquid phase injection of liquefied gaseous fuels for an internal combustion engine, the fuel injector comprising a nozzle portion having an end from which gaseous fuel can be delivered through an outlet, the nozzle portion comprising an inner tube defining a fluid flow path terminating at the outlet and a casing surrounding the inner tube and defining an end face, the end face having a recess therein defining a surface surrounding the inner tube, the inner tube protruding beyond the surface an extent to prevent or at least inhibit formation of ice thereon upon delivery of gaseous fuel through the outlet.

Preferably, the inner tube protrudes beyond the surface by up to about 1.5 mm.

Preferably, the casing comprises an outer tube surrounding the inner tube.

According to a third aspect of the invention there is provided a fuel injector for liquid phase injection of liquefied gaseous fuels into an internal combustion engine, the fuel injector comprising a nozzle portion having an end from which gaseous fuel can be delivered through an outlet, the nozzle portion comprising an inner tube defining a fluid flow path terminating at the outlet and an outer tube surrounding the inner tube and having an end face with a recess therein defining a surface surrounding the inner tube, the inner tube protruding beyond the end face of the outer tube by about 0.05 to 1.5 mm.

According to a fourth aspect of the invention there is provided a fuel injector for liquid phase injection of liquefied gaseous fuels into an internal combustion engine, the fuel injector comprising a nozzle portion having an end from which gaseous fuel can be delivered through an outlet, the nozzle portion comprising an inner tube defining a fluid flow path terminating at the outlet and a casing surrounding the inner tube and defining an end face, the end face defining a surface surrounding the inner tube, the inner tube protruding beyond the surface an extent to prevent or at least inhibit formation of ice thereon upon delivery of gaseous fuel through the outlet.

According to a fifth aspect of the invention there is provided fuel injector for liquid phase injection of liquefied gaseous fuels into an internal combustion engine, the fuel injector comprising a nozzle portion having an end from which gaseous fuel can be delivered through an outlet, the nozzle portion comprising an inner tube defining a fluid flow path terminating at the outlet and an outer tube surrounding the inner tube and having an end face defining a surface surrounding the inner tube, the inner tube protruding beyond the end face of the outer tube by up to about 1.5 mm.

Preferably, the fuel injector according to any one of the preceding aspects of the invention is configured for indirect injection of fuel into a combustion chamber of an internal combustion engine. With this delivery arrangement, the fuel injector typically communicates with some point before an intake valve for the combustion chamber, typically into an inlet manifold communicating with the combustion chamber through the inlet valve. With this delivery arrangement, the fuel injector typically communicates with an injection port in the inlet manifold.

Preferably, the injector comprises an LPI injector.

The injector is particularly, although not necessarily solely, application to indirect injection of LPG into an internal combustion engine.

Preferably, the fuel injector is configured as a side feed injector. However, the injector may also be configured as a top feed injector.

According to a sixth aspect of the invention there is provided a system for liquid phase injection (LPI) of gaseous fuel for an internal combustion engine, the system comprising a fuel injector according to any one of the preceding aspects of the invention.

Preferably, the system is configured for delivery of LPG to fuel the engine.

BRIEF DESCRIPTION OF THE DRAWING

The invention will be better understood by reference to the following description of several specific embodiments thereof as shown in the accompanying drawings in which.

BEST MODE(S) FOR CARRYING OUT THE INVENTION

The embodiments are each directed to liquid phase injection (LPI) of gaseous fuels such as LPG indirectly into the combustion chamber of an engine using a fuel injector 10. The fuel injector 10 forms part of an LPI system. Typically, the engine would comprise a multi-cylinder engine fitted with the LPI system, with one fuel injector 10 corresponding to each cylinder of the engine.

In the arrangement illustrated, the LPI system is configured for indirect injection of fuel into combustion chambers of an engine. With this delivery arrangement, the fuel injector 10 communicates with an injection port 11 defined by an intake manifold injector bore surround 12.

Figure 1:
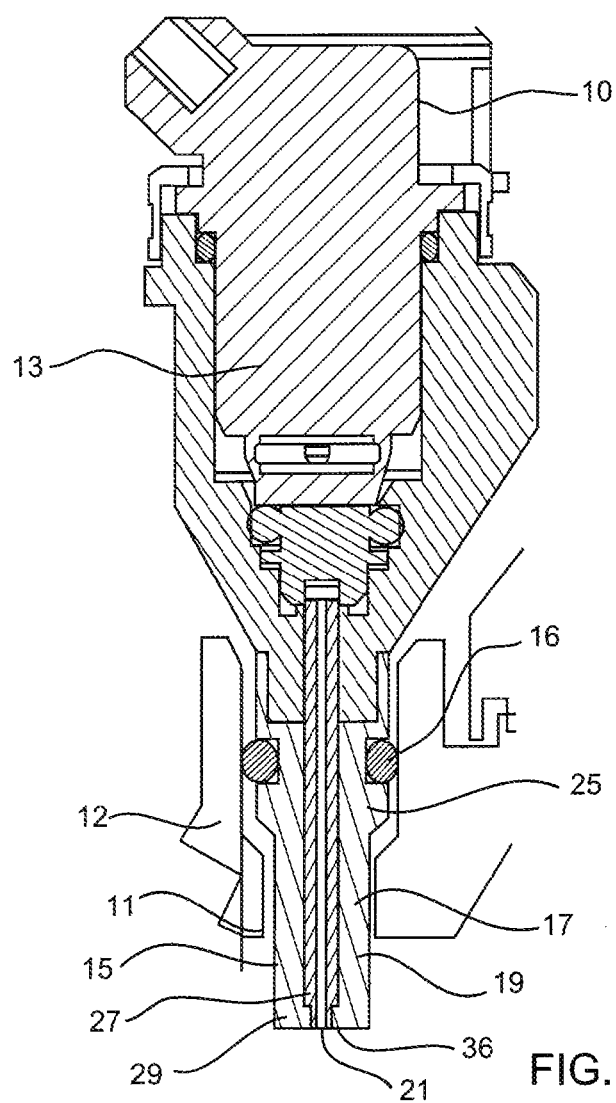
FIG. 1 is a schematic fragmentary view of a fuel injector according to the first embodiment installed in an injector port.
Figure 2:
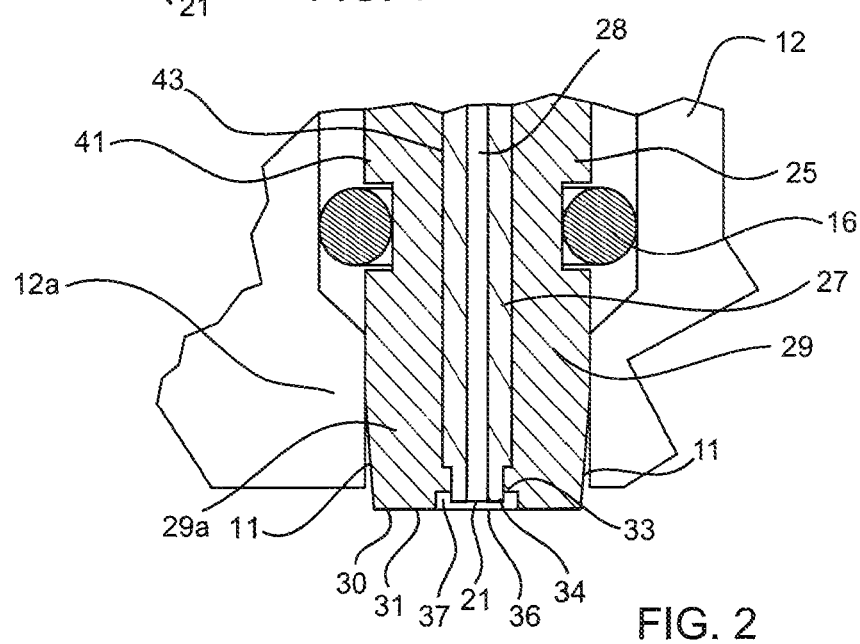
FIG. 2 is a fragmentary view on enlarged scale of the tip end of the fuel injector in the injector port.
Figure 3:
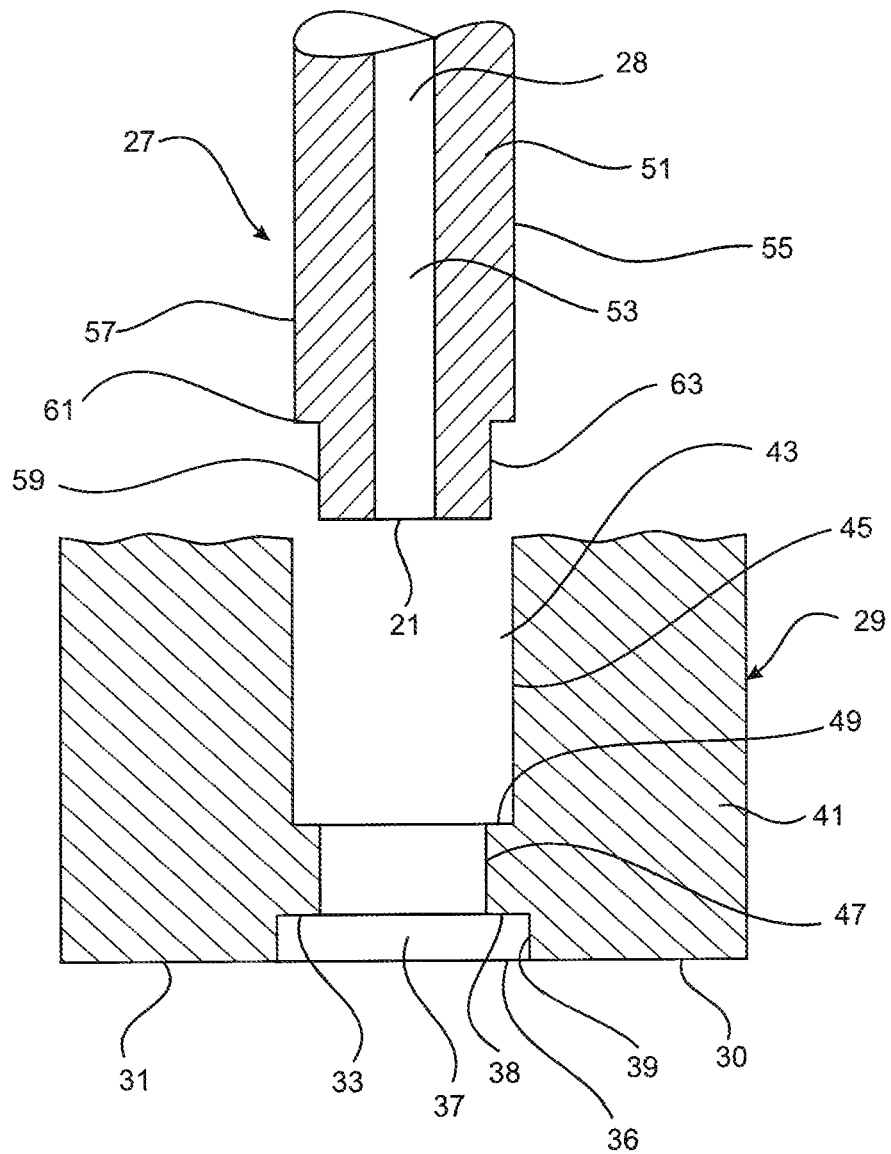
FIG. 3 is an exploded fragmentary view of the tip end of the fuel injector.

Referring to FIGS. 1, 2 and 3, there is shown a fuel injector 10 according to a first embodiment comprising a body portion 13 and a nozzle portion 15 extending from the body portion. The nozzle portion 15 is configured as an extension 17 to define a tip 19. The nozzle portion 15 defines an outlet 21 at the end of the tip 19 from which the liquefied gaseous fuel is delivered into the respective intake manifold injector port 11. During the delivery process there is a phase change in the flow passage within the fuel injector 10 and at the outlet 21 which can lead to rapid cooling and, consequently, formation of ice on the injector tip 19. Ice formation on the injector tip 19 is disadvantageous as it can lead to deterioration in the delivery of fuel to the engine.

The nozzle portion 15 comprises a tube assembly 25 having an inner tube 27 defining a fuel flow path 28 which terminates at the outlet 21, and a casing providing an outer tube 29 surrounding the inner tube 27.

The tube assembly 25 is adapted to provide internal thermal insulation to prevent heat transfer during passage of the liquefied gaseous fuel along the fuel flow path 28 to the outlet 21. Further, the tube assembly 25 is adapted externally to collect heat from the engine environment, thereby contributing to a thermal gradient between the injector tip 19 and the passage of the liquefied gaseous fuel along the fuel flow path 28 to the outlet 21. The heat so collected may also assist in the reduction of ice formation ice on the injector tip 19.

Specifically, the inner tube 27 is formed of a thermally insulating material to inhibit heat transfer to the liquefied gaseous fuel along the fuel flow path 28 to the outlet 21. In this embodiment, the inner tube 27 comprises a Teflon tube, although any other appropriate thermally insulating material may, of course, be used.

The outlet 21 is defined by the end of the inner tube 27.

The outer tube 29 is formed of a thermally conductive material for thermal collection. Typically, the outer tube 29 is formed of metal, although any other appropriate thermally conductive material may, of course, be used.

The outer tube 29 is sealing received in the injection port 11 into which the respective fuel injector 10 delivers fuel, the arrangement being such that the free end section 29a of the outer tube 29 can locate in close proximity to the inner end section 12a of the manifold injector bore surround 12 to receive heat from the engine environment, including in particular the inlet manifold. The free end section 29a is configured to optimize positioning within the injection port 11 for heat transfer. A seal 16 on the outer tube 29 establishes a sealing connection between the outer tube 29 and the injection 11.

The outer tube 29 presents an end 30 having an end face 31. The end 30 defines a surface 33 which surrounds the outlet 21 in close proximity thereto and from which the adjacent end section 34 of the inner tube 27 protrudes. In this way, the end face 31 of the nozzle portion 15 is locally spaced beyond the outlet 21. In the arrangement illustrated, the surrounding surface 33 is immediately adjacent the protruding section 34 of the inner tube 27. The outlet 21 is disposed beyond the surrounding surface 33 such that the surrounding surface 33 is located away from the path of fuel issuing from the outlet 21. In this embodiment, the inner tube 27 protrudes beyond the surrounding surface 33 by up to about 1.5 mm, with a protrusion of about 0.05 to 0.5 mm (and more particularly 0.2 to 0.5 mm) being deemed particularly appropriate. In this embodiment, the surrounding surface 33 is defined by the bottom of a recess 36 configured as a hole 37 formed in the end 30 of the outer tube 29.

In the arrangement illustrated, the hole 37 is configured as a straight cylindrical hole with the bottom 38 (which defines the surrounding surface 33) being transverse to the longitudinal extent of the inner tube 27 and a cylindrical side 39 coincident with the inner tube 27. Further, in the arrangement illustrated, the end face 31 of the outer tube 29 is substantially planar and the surrounding surface 33 about the outlet 21 is also planar.

The outer tube 29 comprises a cylindrical body 41 having an axial passage 43 in which the inner tube 27 is adapted to be received. The axial passage 43 comprises a first passage section 45 and a second passage section 47, with the second passage section 47 opening onto the end 30. The first passage section 45 is of slightly larger diameter than the second passage section 47 whereby an annular ledge 49 is defined at the junction therebetween.

The inner tube 27 comprises a tubular body 51 having a central bore 53 which defines the fuel flow path 28 and a cylindrical outer wall 55. The outer wall 55 comprises a first wall section 57 and a second wall section 59, with the second wall section 59 being adjacent the end defining the outlet 21. The first wall section 57 is of slightly larger diameter than the second wall section 59 whereby an annular shoulder 61 is defined at the junction therebetween.

With this arrangement, the inner tube 27 is adapted to be received within the outer tube 29, with the shoulder 61 of the inner tube abutting the ledge 49 within the outer tube 29, as showing in the drawings.

The second wall section 59 of the inner tube 27 defines a tip 63 which extends through the second passage section 47 and beyond the surrounding surface 33 to define the protruding section 34 of the inner tube 27.

With this arrangement, the hole 37 is in effect a countersunk hole disposed about the second passage section 47.

In the arrangement illustrated, the protruding section 34 of the inner tube 27 terminates inwardly of the end face 31 at the end 30 of the nozzle portion 15; that is, the end of the protruding section 34 of the inner tube 27 defining the outlet 21 is slightly recessed with respect to the end face 31. In another arrangement, the protruding section 34 may terminate flush with the end face 31. In any event, the protruding section 34 of the inner tube 27 is within the confines of the outer tube 29 to thereby be afforded protection by the outer tube 29.

It is a feature of the embodiment that the length of the tip 63 is not critical to the effective operation of the fuel injector 10. The location of the inner tube 27 within the outer tube 29 is determined by the annular shoulder 61 of the inner tube seating on the annular ledge 49 within the outer tube 29. The extent to which the tip 63 extends beyond the shoulder 61 is not critical, as the requirement is merely that the end of the tip 63 which defines the outlet 21 be within the confines of the outer tube 29 and spaced from the surrounding surface 33. This is advantageous as it can accommodate manufacturing and assembly tolerances that are typically involved with such components of fuel delivery injectors and avoids the need for precision in the location of the end of the inner tube 27 with respect to the end 30 of the nozzle portion 15 in order for effective delivery of the injected gaseous fuel.

As mentioned previously, it is preferable that the tip 63 protrudes beyond the surrounding surface 33 by about 0.05 to 1.5 mm. This arrangement positions the outlet 21 sufficiently away from the body of the outer tube 29 to prevent the latter from interfering with the delivery of gaseous fuel through the outlet 21 while at the same time providing adequate lateral support for the tip 63 to maintain alignment for delivery of the gaseous fuel in the intended direction. Furthermore, the spatial arrangement is such that formation of ice upon delivery of gaseous fuel through the outlet 21 is prevented, or at least inhibited.

The presence of the recess 36 in the end 30 of the nozzle portion 15 reduces contract area between the tip 63 of the inner tube 27 and the outer tube 29, thereby serving to focus transfer of heat from the outer tube 29 to that portion of the tip 63 in contact with outer tube 29 upstream of the outlet 21. This is advantageous as it further inhibits formation of ice upon delivery of gaseous fuel through the outlet 21.

The arrangement of the first embodiment is particular effective as the recess is so sized and positioned that the surrounding extremity of the nozzle portion is in close proximity to the tip 63. This is advantageous as it facilitates the end of the nozzle portion being hotter than the inner part of the recessed portion of the end, with the resulting temperature gradient on the end part of the nozzle portion contributing to minimisation of the formation of at the injector tip.

Figure 4:
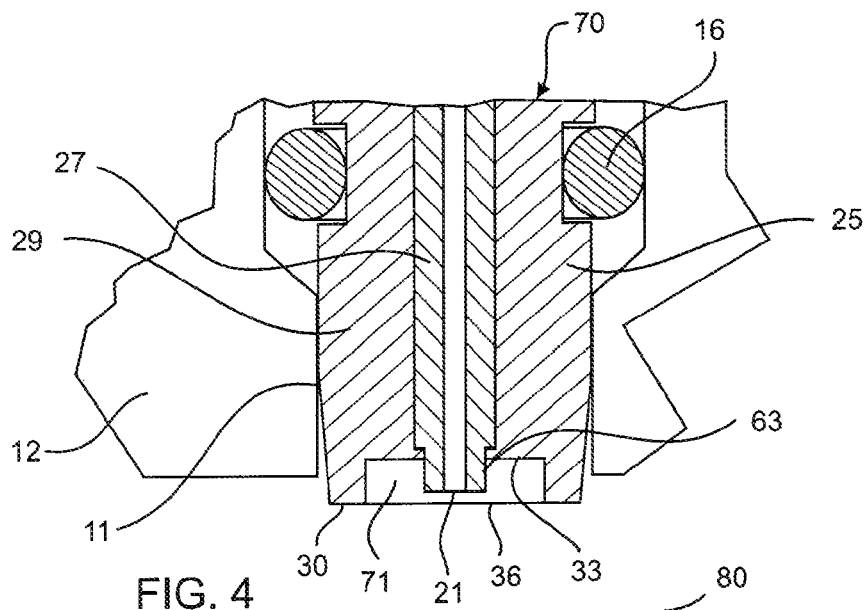
FIG. 4 a fragmentary view on enlarged scale of the tip end of a fuel injector according to a second embodiment in an injector port.

Referring to FIG. 4, there is shown a fuel injector 70 according to a second embodiment. The fuel injector 70 is similar in many respects to the fuel injector 10 according to the first embodiment and so corresponding reference numerals are used to identify corresponding parts.

In this second embodiment, the surrounding surface 33 is defined by the bottom 35 of recess 36 configured as a hole 71 formed in the end 30 of the outer tube 29. In the arrangement illustrated, the hole 71 is configured as a straight cylindrical hole which is wider and deeper than the hole 37 formed in the end 30 of the outer tube 29 of the injector 10 according to the first embodiment. The hole 71 may be of any appropriate cross-sectional profile, including circular or square.

Figure 5:
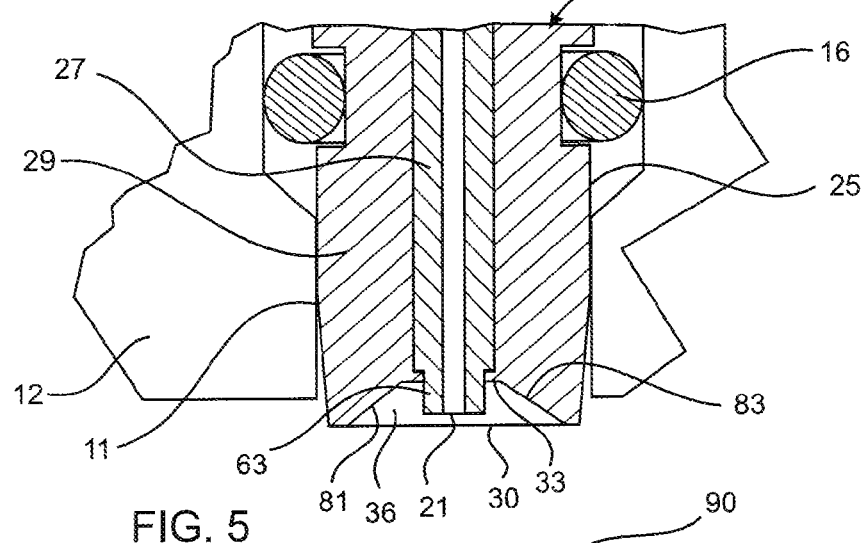
FIG. 5 a fragmentary view on enlarged scale of the tip end of a fuel injector according to a third embodiment in an injector port.

Referring to FIG. 5, there is shown a fuel injector 80 according to a third embodiment. The fuel injector 80 is similar in many respects to the fuel injector 10 according to the first embodiment and so corresponding reference numerals are used to identify corresponding parts.

In this third embodiment, the surrounding surface 33 is defined by recess 36 configured as a hole 81 having a side wall 83 tapered outwardly from the surface 33 towards the end 30 of the outer tube 29. The tapered side wall 83 is angled so as to avoid interference with the delivery of gaseous fuel through the outlet 21. In the arrangement illustrated, the hole 81 is conical.

Figure 6:
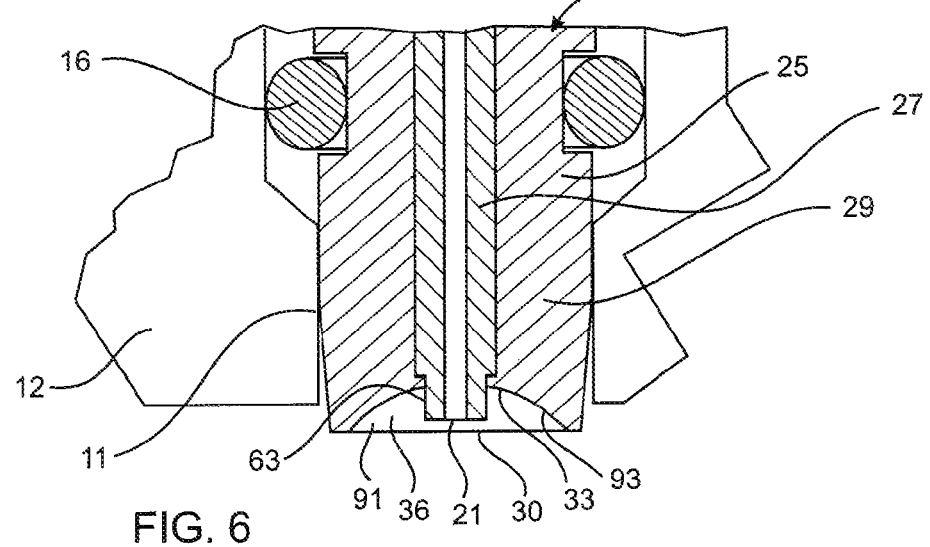
FIG. 6 a fragmentary view on enlarged scale of the tip end of a fuel injector according to a fourth embodiment in an injector port.

Referring to FIG. 6, there is shown a fuel injector 90 according to a fourth embodiment. The fuel injector 90 is similar in many respects to the fuel injector 10 according to the first embodiment and so corresponding reference numerals are used to identify corresponding parts.

In this fourth embodiment, the surrounding surface 33 is defined by recess 36 configured as a bowl 91 having a side wall 93. The side wall 93 is shaped so as to avoid interference with the delivery of gaseous fuel through the outlet 21. In the arrangement illustrated, the recess 91 is of generally spherical configuration.

Figure 7:
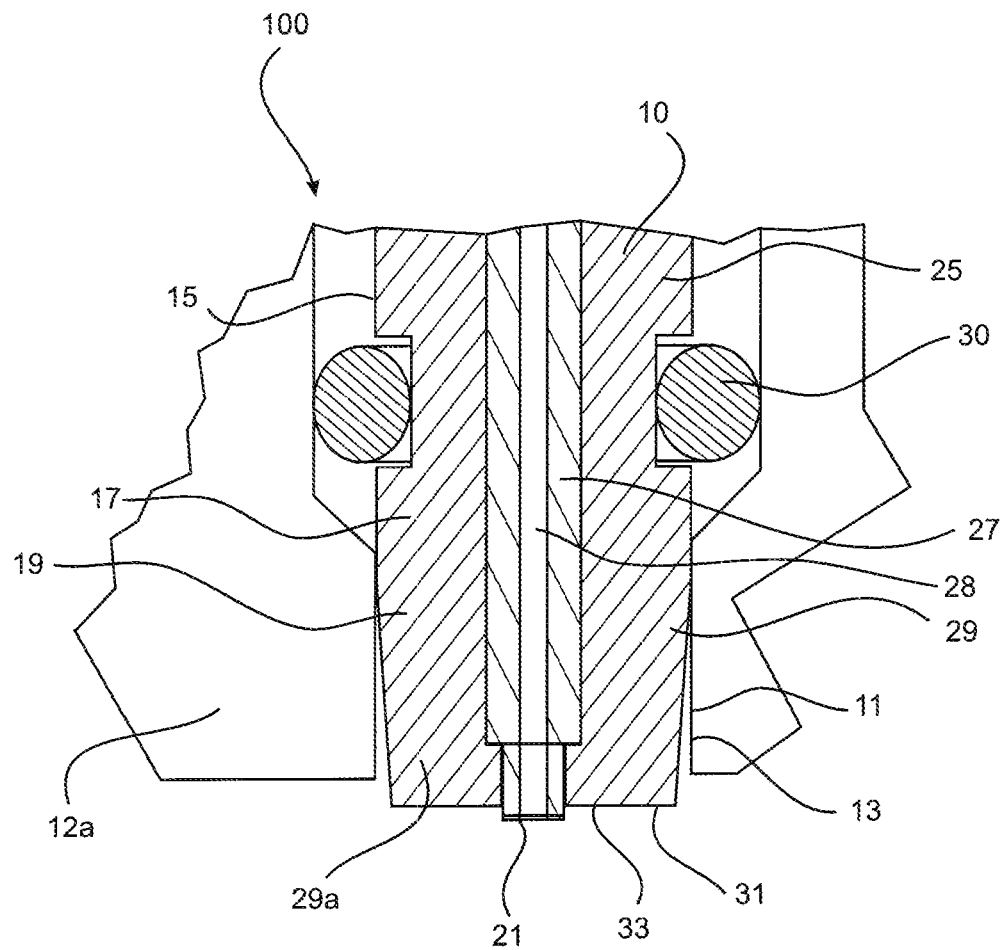
FIG. 7 a fragmentary view on enlarged scale of the tip end of a fuel injector according to a fourth embodiment in an injector port.

Referring to FIG. 7, there is shown a fuel injector 100 according to a fifth embodiment. The fuel injector 100 is similar in many respects to the fuel injector 10 according to the first embodiment and so corresponding reference numerals are used to identify corresponding parts.

In this fourth embodiment, the outer tube 29 presents an end face 31 from which the adjacent end section of the inner tube 27 protrudes. With this arrangement, the exposed end of the inner tube 27 is proud of the end face 31 and the outlet 21 is disposed outwardly of the end face 31.

The end face 31 defines the surface 33 which surrounds the outlet 21 in close proximity thereto. In the arrangement illustrated, the surrounding surface 33 is immediately adjacent the protruding section of the inner tube 27. The outlet 21 is disposed beyond the surrounding surface 33 such that the surrounding surface 33 is located away from the path of fuel issuing from the outlet. The extent to which the inner tube 27 protrudes beyond the end face 31 is controlled and selected to prevent or at least inhibit formation of ice thereon upon delivery of gaseous fuel through the outlet. In this embodiment, the inner tube 27 protrudes beyond the surrounding surface 33 by about 0.2 to 0.5 mm.

In the arrangement illustrated, the end face 31 of the outer tube 29 is substantially planar and consequently the surrounding surface 33 about the outlet 21 is also planar.

From the foregoing, it is evident that the present embodiments each provides a simple yet highly effective way of preventing, or at least inhibiting, formation of ice thereon upon delivery of gaseous fuel through the outlet during an LPI process while facilitating ease of assembly by avoiding the need for precision in establishing the length of the tip 63 for the effective operation of the fuel injector 10.

It should be appreciated that the scope of the invention is not limited to the scope of the embodiments described. By way of example, in the embodiments described the inner tube 27 has been described as protruding beyond the surrounding surface 33 by about 0.05 to 1.5 mm, or more preferably by 0.05 to 0.5 mm. Other disposition of the outlet 21 relative to a surrounding surface 33 may also be effective, the important factors being that the spatial arrangement is such that formation of ice upon delivery of gaseous fuel through the outlet 21 is prevented, or at least inhibited, as previously described.

In another embodiment, which is not shown, the end of the nozzle portion may be provided with means for shielding the nozzle end from the path of fuel issuing from the outlet to prevent, or at least inhibit, formation of ice thereon upon delivery of gaseous fuel through the outlet. The means for shielding the nozzle end from the path of fuel issuing from the outlet may comprise a shroud, cowling or other shield arrangement, and may be configured as an attachment on the end of the nozzle portion.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The invention claimed is:

1. A fuel injector for liquid phase injection of liquefied gaseous fuels for combustion chambers of an internal combustion engine, the fuel injector comprising a nozzle portion having an end from which gaseous fuel can be delivered through an outlet, the end of the nozzle portion being configured by the disposition of the outlet protruding up to 1.5 mm beyond a surface at the end of the nozzle portion surrounding the outlet wherein the surrounding surface is defined by a formation at the end of the nozzle portion, wherein the formation comprises a recess in the end of the nozzle portion about the outlet, and whereby the end of the nozzle portion is hotter than the recess and the resulting temperature gradient prevents or at least inhibits formation of ice on the end of the nozzle portion upon delivery of gaseous fuel through the outlet.

2. The fuel injector according to claim 1 wherein the outlet is disposed beyond the surrounding surface such that the surrounding surface is located away from the path of fuel issuing from the outlet.

3. The fuel injector according to claim 2 wherein there is a spacing of about 0.05 to 0.5 mm between the outlet and the surrounding surface.

4. The fuel injector according claim 1 wherein the recess comprises a depression formed in the end of the nozzle portion, with an inner portion of the depression defining the surrounding surface about the outlet.

5. The fuel injector according to claim 1 wherein the nozzle portion comprises an inner tube defining a fuel flow path terminating at the outlet, and a casing surrounding the inner tube, the casing presenting an end about the outlet, wherein at least a portion of the end defines the surrounding surface.

6. The fuel injector according to claim 5 wherein the casing has an end face and wherein the end of the inner tube is flush with the end face.

7. The fuel injector according to claim 5 wherein the casing has an end face and wherein the end of the inner tube is recessed with respect to the end face.

8. The fuel injector according to claim 5 wherein the recess is configured as a countersunk hole in the end face.

9. The fuel injector according to claim 1 wherein the recess is configured as a hole having a tapered side extending outwardly towards the end face.

10. The fuel injector according to claim 1 wherein the recess is configured as a bowl in the end face.

11. The fuel injector according to claim 1 configured for indirect injection of fuel into a combustion chamber of an internal combustion engine.

12. The fuel injector according to claim 1 wherein the injector comprises an LPI injector.

13. A system for liquid phase injection (LPI) of gaseous fuel for an internal combustion engine, the system comprising a fuel injector according to claim 1.

14. The system according to claim 13 configured for delivery of LPG to fuel the engine.

15. An internal combustion engine having a system for liquid phase injection (LPI) of gaseous fuel in accordance with claim 13.

16. A fuel injector for liquid phase injection of liquefied gaseous fuels for combustion chambers of an internal combustion engine, the fuel injector comprising a nozzle portion having an end from which gaseous fuel can be delivered through an outlet, the end of the nozzle portion being configured by disposition of the outlet protruding up to 1.5 mm beyond a surface at the end of the nozzle portion surrounding the outlet wherein the surrounding surface is defined by a formation at the end of the nozzle portion, wherein the formation comprises a protrusion on the end of the nozzle portion, and whereby the end of the nozzle portion is hotter than the surrounding surface and the resulting temperature gradient prevents or at least inhibits formation of ice on the end of the nozzle portion upon delivery of gaseous fuel through the outlet.

17. The fuel injector according to claim 16 wherein the outlet is disposed beyond the surrounding surface such that the surrounding surface is located away from the path of fuel issuing from the outlet.

18. The fuel injector according to claim 17 wherein there is a spacing of about 0.05 to 0.5 mm between the outlet and the surrounding surface.

19. The fuel injector according to claim 16 wherein the nozzle portion comprises an inner tube defining a fuel path terminating at the outlet, and a casing surrounding the inner tube, the casing presenting an end about the outlet, wherein at least a portion of the end defines the surrounding surface.

20. The fuel injector according to claim 16 wherein the protrusion surrounds the end of the inner tube.

21. A fuel injector for liquid phase injection of liquefied gaseous fuels for an internal combustion engine, the fuel injector comprising a nozzle portion having an end from which gaseous fuel can be delivered through an outlet, the nozzle portion comprising an inner tube defining a fluid flow path terminating at the outlet and a casing surrounding the inner tube and defining an end face, the end face having a recess therein defining a surface at the end, adjacent to the outlet, from which gaseous fuel can be delivered surrounding the inner tube, the inner tube protruding beyond the surface by about 0.05 to 0.5 mm whereby the end of the nozzle portion is hotter than the end face of the casing and the resulting temperature gradient prevents or at least inhibits formation of ice thereon upon delivery of gaseous fuel through the outlet.

22. The fuel injector according to claim 21 wherein the casing comprises an outer tube surrounding the inner tube.

23. A fuel injector for liquid phase injection of liquefied gaseous fuels for an internal combustion engine, the fuel injector comprising a nozzle portion having an end from which gaseous fuel can be delivered through an outlet, the nozzle portion comprising an inner tube defining a fluid flow path terminating at the outlet and an outer tube surrounding the inner tube and having an end face with a recess therein defining a surface surrounding the inner tube, the inner tube protruding beyond the end face of the outer tube by about 0.05 to 0.5 mm, wherein the surface surrounding the inner tube is adjacent the outlet and wherein the end of the nozzle portion is hotter than the recess and the resulting temperature gradient prevents or at least inhibits formation of ice on the end of the nozzle portion upon delivery of gaseous fuel through the outlet.

24. A fuel injector for liquid phase injection of liquefied gaseous fuels for an internal combustion engine, the fuel injector comprising a nozzle portion having an end from which gaseous fuel can be delivered through an outlet, the nozzle portion comprising an inner tube defining a fluid flow path terminating at the outlet and a casing surrounding the inner tube and defining an end face, the end face defining a surface surrounding the inner tube, the inner tube protruding beyond the surface up to about 1.5 mm to prevent or at least inhibit formation of ice thereon upon delivery of gaseous fuel through the outlet, wherein the surface surrounding the inner tube is adjacent the outlet and wherein the end of the nozzle portion is hotter than the surface and the resulting temperature gradient prevents or at least inhibits formation of ice on the end of the nozzle portion upon delivery of gaseous fuel through the outlet.

25. A fuel injector for liquid phase injection of liquefied gaseous fuels for an internal combustion engine, the fuel injector comprising a nozzle portion having an end from which gaseous fuel can be delivered through an outlet, the nozzle portion comprising an inner tube defining a fluid flow path terminating at the outlet and an outer tube surrounding the inner tube and having an end face defining a surface surrounding the inner tube, the inner tube protruding beyond the end face of the outer tube up to about 1.5 mm, wherein the surface surrounding the inner tube is adjacent the outlet and wherein the end of the nozzle portion is hotter than the surface and the resulting temperature gradient prevents or at least inhibits formation of ice on the end of the nozzle portion upon delivery of gaseous fuel through the outlet.

\* \* \* \* \*